R. H. WHITE.
TRACK LAYING TRACTOR.
APPLICATION FILED OCT. 11, 1919.
1,399,370.
Patented Dec. 6, 1921.
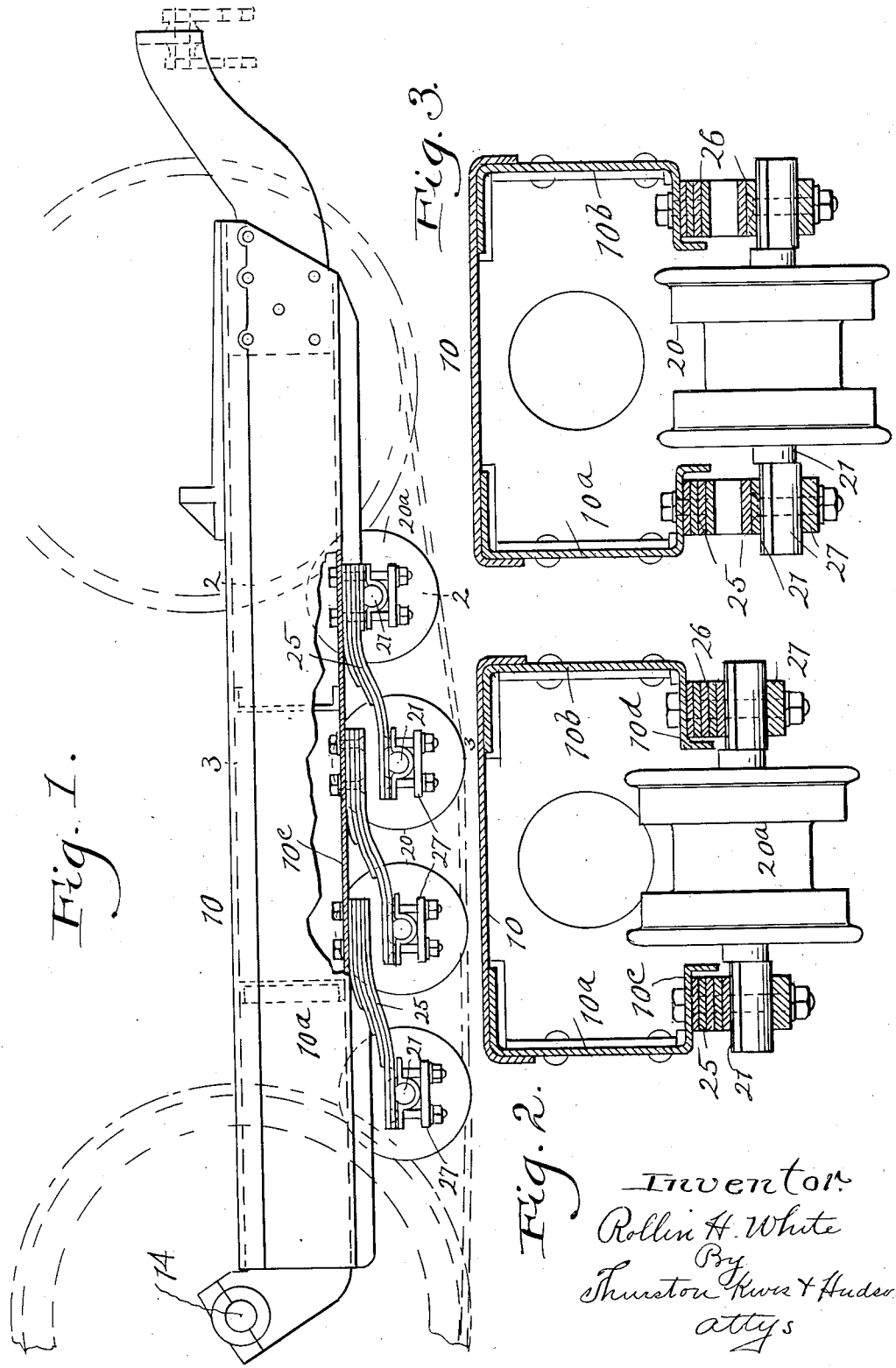

UNITED STATES PATENT OFFICE.

ROLLIN H. WHITE, OF CLEVELAND HEIGHTS, OHIO, ASSIGNOR TO THE CLEVELAND TRACTOR COMPANY, OF EUCLID, OHIO, A CORPORATION OF OHIO.

TRACK-LAYING TRACTOR.

1,399,370.   Specification of Letters Patent.   Patented Dec. 6, 1921.

Application filed October 11, 1919. Serial No. 329,963.

*To all whom it may concern:*

Be it known that I, ROLLIN H. WHITE, a citizen of the United States, residing at Cleveland Heights, in the county of Cuyahoga and State of Ohio, have invented a certain new and useful Improvement in Track-Laying Tractors, of which the following is a full, clear, and exact description.

When a track laying tractor is being driven over rough and uneven ground, the ground reaches of the link belt tracks, as they are laid down, will substantially conform to the uneven surfaces on which they are laid.

It is nevertheless desirable that the weight supporting track wheels shall maintain substantial contact with the uneven tracks, and it is likewise desirable that the track frames be relieved of the shocks and jars which the uneven tracks would induce if shock relieving means were not provided.

The present invention accomplishes both of these desired results, and it is moreover a relatively cheap and efficient construction for the purpose.

In the drawing, Figure 1 is a side elevation with part of the outside side member of the track frame partly broken away; Fig. 2 is a transverse vertical section in the plane of line 2—2 on Fig. 1, and Fig. 3 is a transverse vertical section in the plane of line 3—3 on Fig. 1.

Each of the track frames 10 includes two parallel spaced apart side beams 10$^a$, 10$^b$; and these side beams are provided respectively with the inwardly extended horizontal flanges 10$^c$, 10$^d$ along their lower edges. Each track frame is pivotally hung in the usual way at its rear end on a lateral projection of an axle 14 which, it will be understood, is secured to a part of the main frame.

20 represents track engaging wheels. Each of these wheels is located between the side beams of the track frame, and is rotatably mounted on an axle 21. Each of these axles extends between and is nonrotatably fixed to the ends of two quarter elliptic springs 25, 26, which are respectively secured to the two frame flanges 10$^c$, 10$^d$. These springs at their thick ends are bolted to the under sides of said flanges and extend rearward therefrom; and therefore lie beneath and are protected by said flanges. It is to the free ends of these springs that the ends of the axles are fixed by means of clips 27.

It is obvious that the wheels may move relatively to the track frames, and to each other, and will so move automatically as to engage the track, however uneven it may be.

The front wheel 20$^a$ is mounted on an axle 21 which is not resiliently supported; but this wheel is located in the plane above the normal plane of the resiliently supported wheels 20, and therefore engages a part of the track which is above and out of contact with the ground.

Having described my invention, I claim:—

In a track laying tractor, the combination of a track frame having two parallel spaced apart side beams which are respectively provided along their lower edges with horizontal flanges which extend toward each other, a plurality of pairs of leaf springs, the two springs of each pair being at corresponding ends clamped to the under faces of the two horizontal flanges and being extended therefrom downwardly and rearwardly, a track wheel axle which extends between and is nonrotatably fixed to the free ends of the two springs of a pair, and track wheels rotatably mounted upon said axles.

In testimony whereof, I hereunto affix my signature.

ROLLIN H. WHITE.